United States Patent [19]

Ballard et al.

[11] Patent Number: 4,638,942
[45] Date of Patent: Jan. 27, 1987

[54] ADAPTIVE MICROPROCESSOR CONTROL SYSTEM AND METHOD FOR PROVIDING HIGH AND LOW HEATING MODES IN A FURNACE

[75] Inventors: Gary W. Ballard, Indianapolis; Robert M. Mamot, Plainfield, both of Ind.

[73] Assignee: Carrier Corporation, Syracuse, N.Y.

[21] Appl. No.: 803,374

[22] Filed: Dec. 2, 1985

[51] Int. Cl.⁴ .............................................. F24D 5/00
[52] U.S. Cl. ..................................... 236/10; 236/46 E
[58] Field of Search ............. 236/15 BG, 10, 11, 1 A, 236/47, 1 E, 1 EA, 1 EB, 46 R, 46 E, 46 F; 165/12

[56] References Cited

U.S. PATENT DOCUMENTS

| | | | |
|---|---|---|---|
| 4,288,854 | 9/1981 | Burroughs | 165/26 X |
| 4,292,813 | 10/1981 | Paddock | 236/46 F X |
| 4,356,962 | 11/1982 | Levine | 236/11 |
| 4,373,662 | 2/1983 | Basset et al. | 236/10 |
| 4,460,123 | 7/1984 | Beverly | 236/46 R |

*Primary Examiner*—Harry Tanner
*Attorney, Agent, or Firm*—Dana F. Bigelow

[57] ABSTRACT

An adaptive microprocessor control system and method provide a low heat mode and a high heat mode of a heating cycle in a furnace dependent upon the performance of the previous heating cycle. The duration of the low heat mode and subsequent high heat mode period is a function of the previous low heat mode duration, previous high heat mode duration, and the time period between the end of the previous heating cycle and the beginning of the next heating cycle. The control and method utilize a single-stage thermostat for providing the dual rates of heating.

18 Claims, 4 Drawing Figures

ADAPTIVE MICROPROCESSOR CONTROL SYSTEM AND METHOD FOR PROVIDING HIGH AND LOW HEATING MODES IN A FURNACE

BACKGROUND OF THE INVENTION

The present invention pertains to furnaces, and more particularly to a microprocessor control system and method for providing high and low heating rates in a furnace utilizing a single stage thermostat.

Presently, most furnace controls include a two-stage thermostat for providing dual rate heating, wherein the first stage of the thermostat operates the furnace on low heat and the second stage of the thermostat operates the furnace on high heat. For example, a typical two-stage thermostat comprises two small mercury bulb contacts on a bi-metal sensor that close and open as a function of the movement of the bi-metal sensor in response to changing temperatures. If the present temperature is below a desired temperature setpoint, for example, one degree to two degrees below the setpoint, then the low heat mercury bulb contact closes to provide low heat. If the temperature continues to drop to, for example, three degrees below the desired temperature setpoint, then the second mercury bulb contact closes to provide a high rate of heat. When the heating load is satisfied, both of the mercury bulb contacts will sequentially open or deactivate, thereby terminating the heating cycle. Thereafter, when the thermostat contacts close indicating a new heating load to be satisfied, then the furnace control repeats the same heating cycle all over again.

Several disadvantages of the above type of furnace control include the requirement of a two-stage thermostat for providing dual rates of heat and large room temperature swings.

SUMMARY OF THE INVENTION

It is an object of the present invention to provide an improved furnace control and method therefor.

Another object of the present invention is to provide a furnace control and method that utilize a single stage thermostat for providing dual rates of heat.

Yet another object of the present invention is to provide a furnace control and method that uses an adaptive furnace control scheme that satisfies a new heating load as a function of the last heating cycle performance.

A further object of the present invention is to provide a furnace control and method that consumes less energy by providing a minimum amount of high heat.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein.

DETAILED DESCRIPTION

Figure 1:
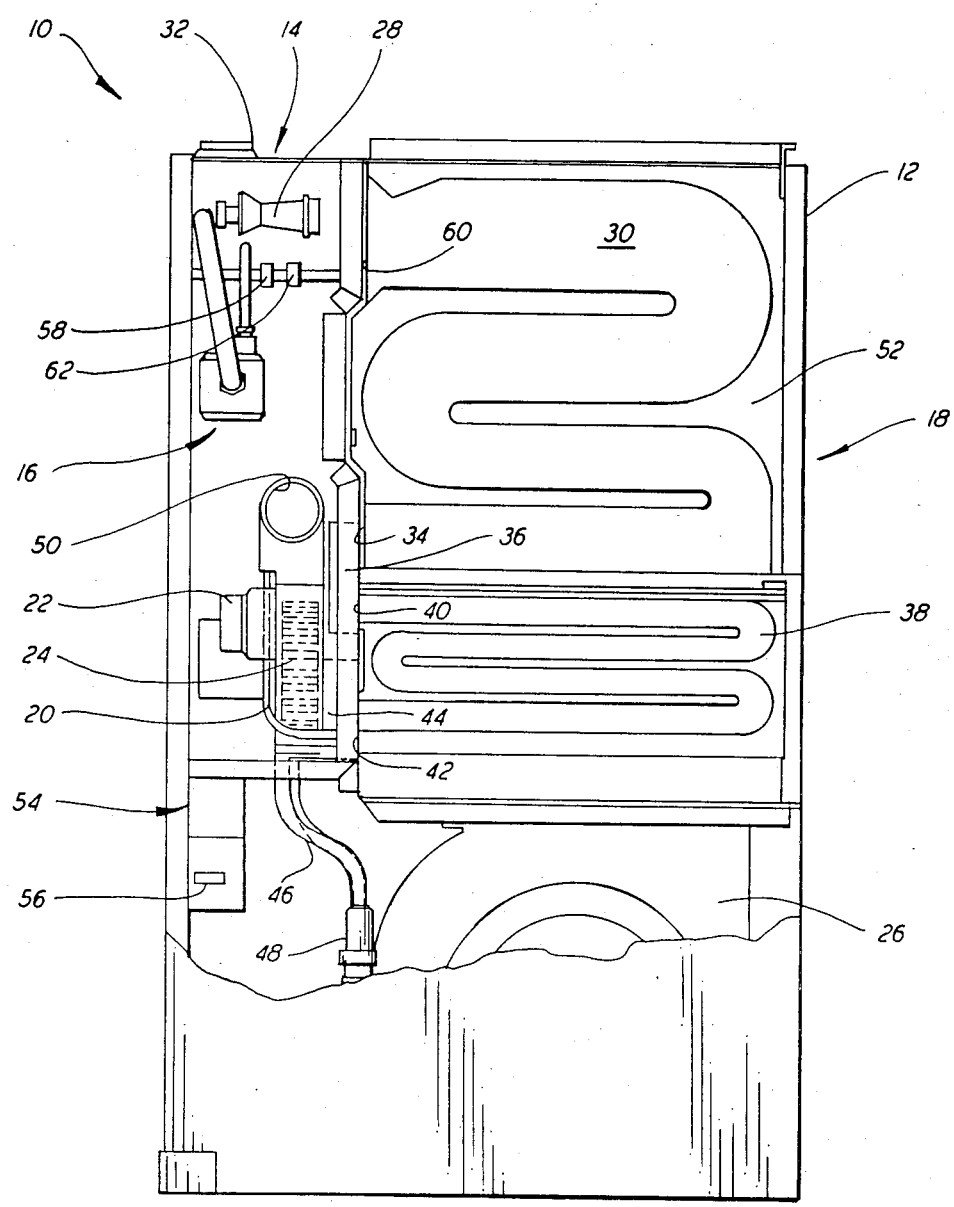
FIG. 1 is a partially broken-away side elevational view of a furnace incorporating the principles of the present invention.

Referring to FIG. 1, there is illustrated a gas-fired furnace which may be operated according to the principles of the present invention. The following description is made with reference to condensing furnace 10, but it should be understood that the present invention contemplates incorporation with a noncondensing-type furnace. Referring now to FIG. 1, condensing furnace 10 includes in major part steel cabinet 12 housing therein burner assembly box 14, combination gas control 16, heat exchanger assembly 18, inducer housing 20 supporting inducer motor 22 and inducer wheel 24, and circulating air blower 26. Combination gas control 16 includes pilot circuitry for controlling and proving the pilot flame. This pilot circuitry or control can be a Hamilton Standard Controls model 740A pilot obtainable from Hamilton Standard Controls, New Lexington, Ohio. Combination gas control 16 can provide dual rates of gas flow to burner assembly 14, a low gas flow rate and a high gas flow rate.

Burner assembly 14 includes at least one inshot burner 28 for at least one primary heat exchanger 30. Burner 28 receives a flow of combustible gas from combination gas control 16 and injects the fuel gas into primary heat exchanger 30. A part of the injection process includes drawing air into heat exchanger assembly 18 so that the fuel gas and air mixture may be combusted therein. A flow of combustion air is delivered through combustion air inlet 32 to be mixed with the gas delivered to burner assembly 14.

Primary heat exchanger 30 includes an outlet 34 opening into chamber 36. Connected to chamber 36 and in fluid communication therewith are four condensing heat exchangers 38, only one of which is shown and having an inlet 40 and an outlet 42. Outlet 42 opens into chamber 44 for venting exhaust flue gases and condensate.

Inducer housing 20 is connected to chamber 44 and has mounted therewith inducer motor 22 with inducer wheel 24 for drawing the combusted fuel air mixture from burner assembly 14 through heat exchanger assembly 18. Air blower 26 delivers air to be heated upwardly through air passage 52 and over heat exchanger assembly 18, and the cool air passing over condensing heat exchangers 38 lowers the heat exchanger wall temperature below the dew point of the combusted fuel air mixture causing a portion of the water vapor in the combusted fuel air mixture to condense, thereby recovering a portion of the sensible and latent heat energy. The condensate formed within heat exchangers 38 flows through chamber 44 into drain tube 46 to condensate trap assembly 48. As air blower 26 continues to urge a flow of air to be heated upwardly through heat exchanger assembly 18, heat energy is transferred from the combusted fuel air mixture flowing through heat exchangers 30 and 38 to heat the air circulated by blower 26. Finally, the combusted fuel air mixture that flows through heat exchangers 30 and 38 exits through outlet 42 and is then delivered by inducer motor 22 through exhaust gas outlet 50 and thence to a vent pipe (not shown). Both inducer motor 22 and the motor (not shown) for air blower 26 are electronically commutated to provide variable speed operation.

Cabinet 12 also houses microprocessor control 54, LED display 56, low pressure switch 58, and high pressure switch 62. Switches 58 and 62 are disposed in burner assembly box 14 and are plumbed in parallel such that each senses the differential pressure between the gas manifold and burner assembly box 14. Low pressure switch 58 closes as the pressure increases above a first predetermined pressure and will open when the pressure decreases below the first predetermined pressure. High pressure switch 62 operates similarly to a second predetermined pressure that is greater than the first predetermined pressure.

Figure 2:
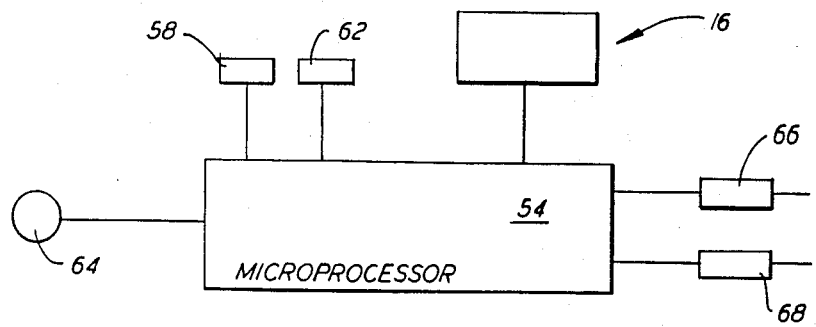
FIG. 2 is a block diagram of a portion of the furnace control system.

Referring to FIG. 2, there is illustrated a simplified block diagram illustrating the interconnection between microprocessor control 54 and pressure switches 58, 62, thermostat 64, gas valve 16, air blower motor control 66 for air blower 26, and inducer motor control 68 for motor 22. Both controls 66, 68 generate respective RPM pulse signals and contain respective optical couplers to isolate the respective RPM pulse output signal. Thermostat 64 is a single stage-type thermostat, i.e., has one mercury bulb contact.

The present invention provides an adaptive microprocessor control for providing a low heat mode and a high heat mode of a heating cycle in furnace 10 as a function of the previous heating cycle, particularly the length of time of operation of the previous heating cycle's low heat mode, high heat mode, and the duration of time between the end of the previous heating cycle and the beginning of the new heating cycle. The adaptive control optimizes the time the furnace operates in the low heat mode, which is approximately 67% of the high heat mode, thereby minimizing energy consumption and providing a more efficient furnace. Before proceeding further, the term "adaptive control" should be further defined and compared to other terms, such as "demand control" and "timed control". In a system operated by a "timed control", the function controlled by the timed control occurs at predetermined times or at the end of predetermined intervals. For example, if furnace 10 were controlled by a "timed control", it would be designed to provide heat every fifteen minutes at one given rate of heat flow. Naturally, this type of control for furnace 10 would be undesirable since it does not compensate for varying temperature conditions within the space to be heated.

In a system operated by a "demand control", the function controlled by the demand control occurs only when necessary and in a prescribed manner. For example, if furnace 10 were controlled by a "demand control", it would come on to provide heat when the temperature of the space to be heated dropped below a predetermined temperature, and the heating cycle provided by furnace 10 would be the same as previous cycles. In other words, when furnace 10 would come on to provide heat, it would provide heat for a given period of time at given heat flow rates.

In the present invention, "adaptive control" refers to a function that is controlled to occur only when needed, and at a rate and for a period of time based and dependent upon a previous heating cycle performance. Thus, unlike the "timed control", but like the "demand control", the "adaptive control" causes furnace 10 to come on only when sensing a heating load to be satisfied. However, unlike the other two controls, the "adaptive control" modifies the behavior or performance of the next heating cycle based upon the behavior or performance of the previous heating cycle, thereby providing a more efficient operation of furnace 10.

The present invention further provides that the adaptive control provide a heating cycle of a given duration. For example, in the description below, the heating cycle is shown to be fifteen minutes of a combination of a low heat mode and a high heat mode. The duration of each of the heat modes can vary, but their sum will provide fifteen minutes of heat. However, the present invention also contemplates that the adaptive control can continue operation of either heat mode until the heating load is satisfied.

Figure 3:
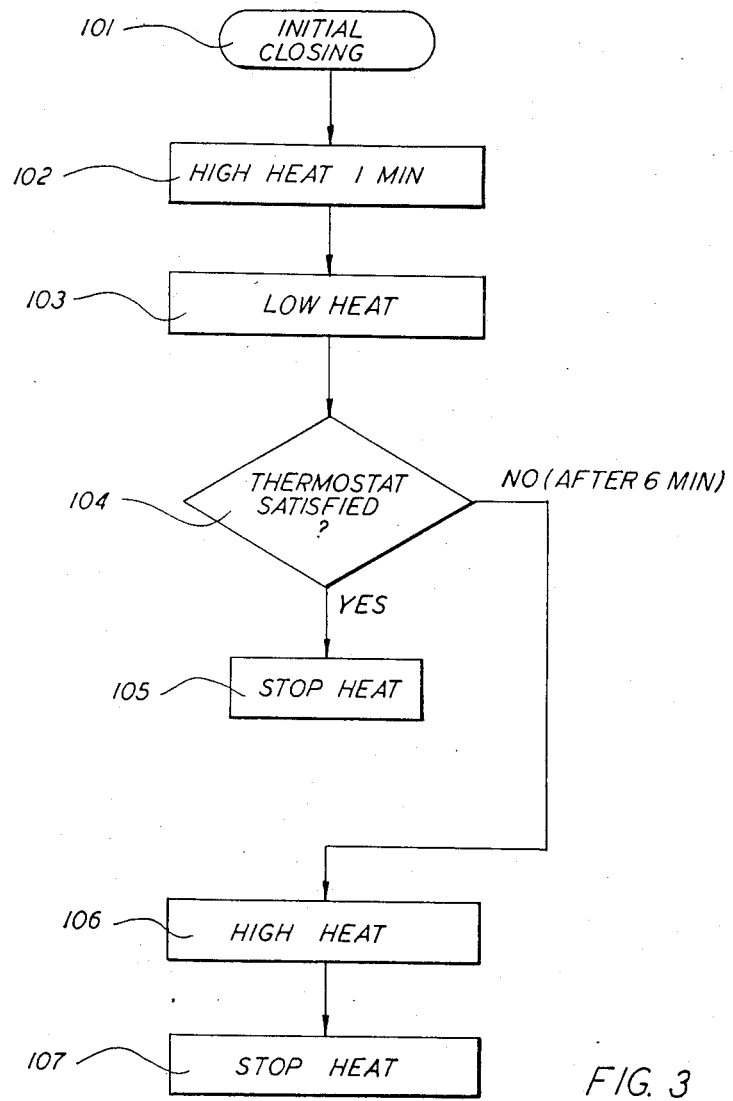
FIG. 3 is a flow diagram illustrating an initial heating cycle of the furnace control system.
Figure 4:
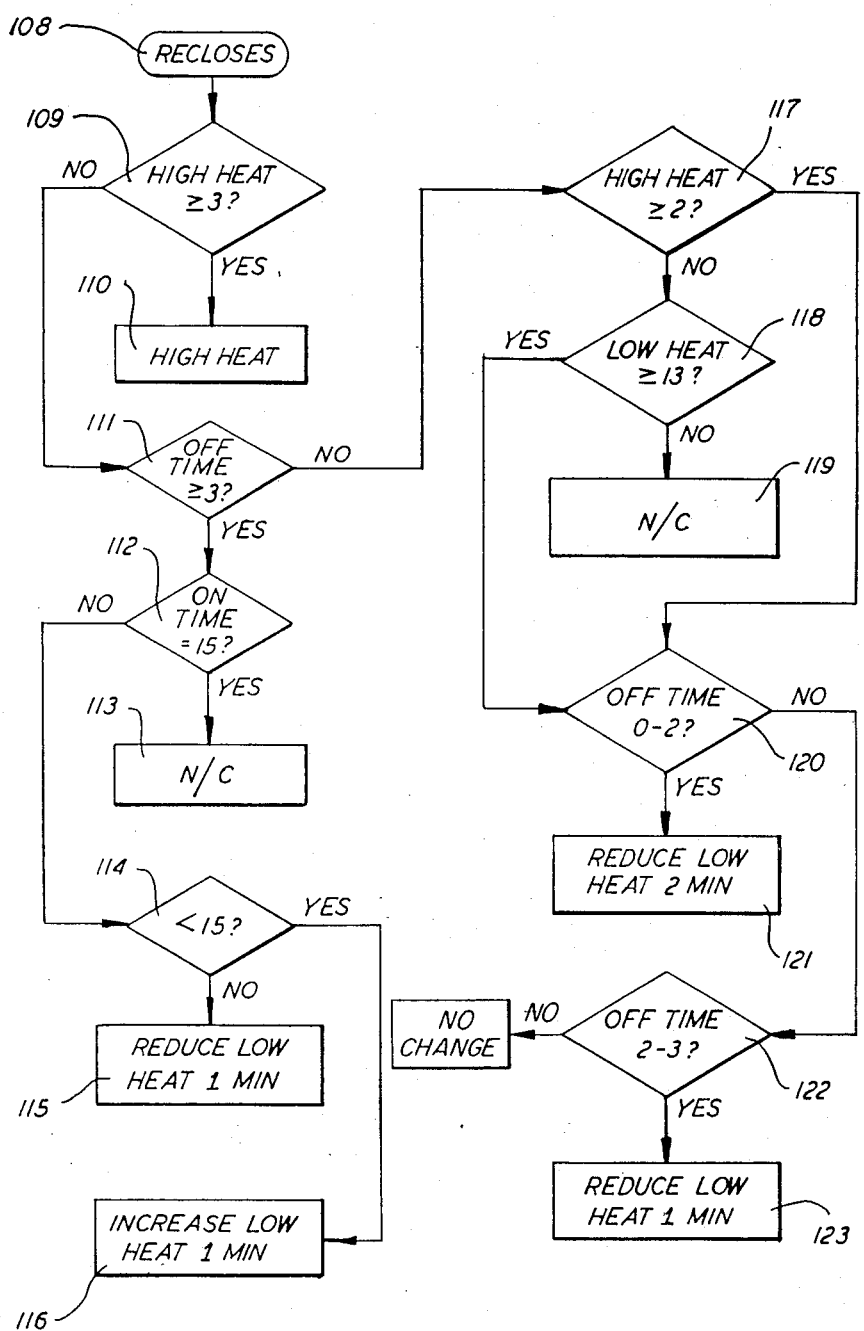
FIG. 4 is a flow diagram illustrating subsequent heating cycles of the furnace control system.

In the description that follows with reference to FIGS. 3 and 4, each of the steps can represent a subroutine or a series of steps in the heating cycle. Microprocessor control 54 has its control logic programmed to follow instructions given at each step. Control 54 is programmed to receive input, process the input, and generate output in response thereto. Referring primarily to FIG. 3, which illustrates a flow diagram of an initial heating cycle, step 101 represents thermostat 64 sensing a heating load to be satisfied by the closing of its single-stage contact, and the generating of a signal to microprocessor control 54 indicating a need for heat. At step 102, microprocessor 54 in response to receiving the signal from thermostat 64 generates a signal to inducer motor control 68 for starting inducer motor 22. As the speed of inducer motor 22 increases, low-pressure switch 58 closes and is sensed by microprocessor control 54, which energizes a gas valve hold coil (not shown) in combination gas control 16. As the speed of motor 22 continues to increase, high-pressure switch 62 closes thereby causing microprocessor 54 to generate a signal to gas control 16 to energize a high heat solenoid (not shown). At this point, the speed of motor 22 is maintained constant by microprocessor 54 for a period of ten seconds to purge burner assembly 14 and heat exchanger assembly 18. Still at step 102, after the ten second purge, microprocessor control 54 generates a signal to gas control 16 to energize the pilot gas valve pick coil and sparker, and the flame provided thereby is proved by a flame proving contact, following which the main valve (not shown) in gas control 16 is energized. With the main valve open, inshot burner 28 is ignited to burn the mixture of fuel and air delivered thereto. Microprocessor control 54 then causes gas control 16 to provide a relatively high flow rate of gas to sustain the high heat mode for a period of one minute to ensure proper burner ignition and to quickly heat the surfaces of heat exchanger assembly 18.

Step 103 occurs after the one minute of high heat mode and includes microprocessor 54 generating a signal to inducer motor control 68 to slow inducer motor 22 to a speed that opens high-pressure switch 62 but maintains low-pressure switch 58 closed. Also, microprocessor control 54 generates a signal to air motor blower control 66 to begin operation of air blower 26 to deliver a flow of air to be heated through air passage 52. Further, in response to the opening of high-pressure switch 62, microprocessor control 54 generates a signal to gas control 16 to provide a lower gas flow rate for the low heating mode.

Step 104 indicates the end of the six minute low heat mode, and if the contact of thermostat 64 has opened prior to this time indicating the heating load has been satisfied, then the control proceeds to step 105 where microprocessor control 54 terminates operation of gas control 16 and inducer motor 22. Control 54 will terminate operation of air blower 26 at a selected time period, for example, 60–240 seconds, after termination of gas flow.

If at step 104, the contact of thermostat 64 remains closed, step 106 causes microprocessor control 54 to increase the speed of inducer motor 22 by generating a speed increase signal to inducer motor control 68, and upon the closing of high-pressure switch 62, causes control 54 to generate a signal to gas control 16 to provide the high rate of gas flow for the high heat mode. This condition maintains until the contact of thermostat 64 opens, at which time the system proceeds to step 107 which causes control 54 to terminate gas flow from gas control 16 and to terminate operation of inducer motor 22. Again, air blower 26 will be allowed to operate a predetermined period of time after the termination of gas flow by control 54.

During this and subsequent heating cycle operation of furnace 10 by the present invention, as described further below, the heating mode in which furnace 10 is operating is indicated by LED display 56. Display 56 will indicate with a visual code whether furnace 10 is in the high or low heat mode.

On subsequent heating cycles, the adaptive control system of the present invention will provide a combination of a low heat mode and a high heat mode based upon the previous heating cycle. For purposes of clarification, an exemplary description of the operation of the present invention will be made in reference to the duration of the previous heating cycle's low and high heat mode time periods, and thereafter a second description will follow wherein the new heating cycle is dependent upon the duration of time between the end of the previous heating cycle and the beginning of the new cycle as represented by thermostat 64. Thereafter, FIG. 4 will be referred to in describing a preferred embodiment of the present invention.

After the initial heating cycle, the time period of operation in the low heat mode, the time period of operation in the high heat mode, and the period of time between the end of the previous heating cycle and the beginning of the new heating cycle as evidenced by thermostat 64 closing, are stored in the memory of microprocessor control 54 for the purpose of modifying the heat modes of the next heating cycle. If thermostat 64 was satisfied in the high heat mode in less than three minutes, control 54 will increase the length of the next heating cycle low heat mode period by one minute from six minutes to seven minutes, and thereafter will initiate the high heat mode until thermostat 64 opens. If thermostat 64 opens on this cycle with less than three minutes in the high heat mode, control 54 will again increase the length of the low heat period by one minute on the next heating cycle from seven minutes to eight minutes. The low heat mode time period will increment up to fifteen minutes maximum of low heat. If thermostat 64 is still closed after fifteen minutes in the low heat mode, control 54 will initiate the high heat mode until thermostat 64 opens.

If control 54 senses the high heat mode for more than three minutes of operation, control 54 will decrease the low heat mode time period by one minute from fifteen minutes to fourteen minutes on the next cycle and initiate a one minute period of high heat. Control 54 will continue to decrease the low heat mode time period in one minute increments. If the high heat mode time period is three minutes longer than the previous high heat mode time period, then control 54 will eliminate the next low heat mode feature.

Control 54 of the present invention also provides a combination of low heat mode and high heat mode as a function of the duration of time between the ending of the previous heating cycle and the beginning of the new heating cycle. For example, if the off time between heating cycles is three minutes or longer and the total on time of both high and low heat modes equaled fifteen minutes, then there is no change in the next heating cycle. If the off time between cycles is between two and three minutes, control 54 will decrease the low heat mode time period by one minute, providing the previous heating cycle had two minutes in the high heat mode. If the off time is between zero and two minutes, control 54 would decrease the low heat mode time period on the next cycle by two minutes, providing the last heat cycle had two minutes in the high heat mode. If the off time was less than three minutes, but the previous cycle included only the low heat mode, there would be no change in the next heating cycle.

Referring now to FIG. 4, there is illustrated a flow diagram of one embodiment of a subsequent heating cycle in accordance with the principles of the present invention. At step 108, thermostat 64 has again sensed the existence of a heating load to be satisfied and generates a signal in response thereto to microprocessor control 54. At step 109, control 54 recalls from the previous heating cycle whether the time period of operation in the high heat mode was equal to or greater than three minutes. If the time period is equal to or greater than three minutes, then at step 110 microprocessor control 54 will provide all heat in the high heat mode. This situation of no low heat and all high heat covers a transitory period of extreme cold, for example, if a door or a window in the space to be heated has been open for a period of time sufficient to lower the temperature therein to a temperature much lower than normal. At step 110, the high heat mode will be provided until thermostat 64 opens.

If at step 109, control 54 recalls that the increase in the high heat mode time period was not equal to or greater than three minutes, then at step 111 control 54 recalls whether the thermostat off time was greater than or equal to three minutes. If the thermostat off time was greater than three minutes on the previous heating cycle, then at step 112 control 54 determines whether the last on time of furnace 10 was equal to fifteen minutes, and if so, at step 113 there is no change in the next heating cycle. However, if the last on time of furnace 10 was not equal to fifteen minutes, then at step 114 control 54 recalls whether the furnace on time was less than fifteen minutes. If the on time was not less than fifteen minutes, then at step 115 control 54 will reduce the time period in the low heat mode by one minute. However, if control 54 determines the on time was less than fifteen minutes, then at step 116 control 54 increases the time period in the low heat mode by one minute.

Returning now to step 111, if control 54 recalls the thermostat off time was not equal to or greater than three minutes, then at step 117 it will recall the time period of operation of the high heat mode in the previous cycle. If the high heat mode time period was not equal to or greater than two minutes, and if the time period in the low heat mode was not equal to or greater than thirteen minutes at step 118, then at step 119 control 54 would repeat the same heating cycle as the previous heating cycle. However, if at step 118, control 54 determines the time period of the low heat mode of the previous heating cycle was equal to or greater than thirteen minutes, then at step 120 control 54 determines whether the last thermostat off time was between zero and two minutes, and if so will reduce the time period of the low heat mode by two minutes. If at step 120, control 54 determines the thermostat off time was not zero to two minutes, then at step 122 control 54 determines if the thermostat off time was between two to three minutes. If so, then at step 123 control 54 reduces the time period of the low heat mode by one minute.

Returning to step 117, if control 54 recalls that the time period of the high heat mode in the previous heating cycle was equal to or greater than two minutes, then control 54 proceeds to steps 120–123 as appropriate.

In the explanation above with reference to FIG. 4, it was assumed that the total furnace on time would equal fifteen minutes, which is the summation of the on times of the low heat mode and the high heat mode. However, control 54 can be preprogrammed to maintain the high heat mode for whatever period of time is required to satisfy thermostat 64.

While this invention has been described as having a preferred embodiment, it will be understood that it is capable of further modifications. This application is therefore intended to cover any variations, uses, or adaptations of the invention following the general principles thereof, and including such departures from the present disclosure as come within known or customary practice in the art to which this invention pertains and fall within the limits of the appended claims.

What is claimed is:

1. A method for selectively providing a low heat mode and a high heat mode of a heating cycle in a furnace as a function of a previous heating cycle, comprising the steps of:
   storing a previous time period of operation of a low heat mode and a previous time period of operation of a high heat mode of a previous heating cycle,
   determining the existence of a heating load to be satisfied,
   recalling the stored time period of the previous high heat mode,
   providing a low heat mode for a selected first time period dependent upon the stored time period of the previous high heat mode, and
   terminating the low heat mode if the heating load is satisfied during the selected first time period.

2. The method of claim 1 further comprising the steps of:
   determining whether continuation of the heating load still exists after the selected first time period of the low heat mode,
   providing a high heat mode if the heating load continues until the heating load is satisfied, and
   terminating the high heat mode when the heating load is satisfied.

3. The method of claim 1 wherein the selected first time period of the low heat mode is greater than the stored time period of the previous low heat mode when the stored time period of the previous high heat mode is less than a predetermined amount of time.

4. The method of claim 1 wherein the selected first time period of the low heat mode is less than the stored time period of the previous low heat mode when the stored time period of the previous high heat mode is greater than a predetermined amount of time.

5. The method of claim 1 further comprising the step of storing the time at which the previous heating cycle ended,
   wherein the step of recalling includes recalling the previous heating cycle end time, and
   wherein the step of providing the low heat mode is further dependent upon the time duration between the previous heating cycle end time and determination of the existing heating load to be satisfied.

6. The method of claim 1 wherein determination of the existing heating load is performed by a single-stage thermostat.

7. A method for selectively providing a low heat mode and a high heat mode of a heating cycle in a furnace as a function of a previous heating cycle, comprising the steps of:
   storing the time at which a previous heating cycle ended,
   determining the existence of a heating load to be satisfied,
   recalling the stored end time of the previous heating cycle,
   providing a low heat mode for a selected first time period dependent upon the time duration between the previous heating cycle end time and determination of the existing heating load to be satisfied, and
   terminating the low heat mode if the heating load is satisfied during the selected first time period.

8. The method of claim 7 further comprising the steps of:
   determining whether continuation of the heating load still exists after the selected first time period of the low heat mode,
   providing a high heat mode if the heating load continues until the heating load is satisfied, and
   terminating the high heat mode when the heating load is satisfied.

9. The method of claim 7 wherein determination of the existing heating load is performed by a single-stage thermostat.

10. The method of claim 7 further comprising the step of storing a previous time period of operation of a low heat mode and a previous time period of operation of a high heat mode of the previous heating cycle,
    wherein the step of recalling includes recalling the stored time period of the previous high heat mode, and
    wherein the step of providing the low heat mode is further dependent upon the stored time period of the previous high heat mode.

11. The method of claim 10 further comprising the steps of:
    determining whether continuation of the heating load still exists after the selected first time period of the low heat mode,
    providing a high heat mode if the heating load continues until the heating load is satisfied, and
    terminating the high heat mode when the heating load is satisfied.

12. An adaptive control system for providing a low heat mode and a high heat mode of a heating cycle in a furnace as a function of a previous heating cycle, comprising:
    means for storing a previous time period of operation of a low heat mode and a previous time period of operation of a high heat mode of a previous heating cycle,
    means for determining the existence of a heating load to be satisfied,
    means for recalling the stored time period of the previous high heat mode,
    means for providing a low heat mode for a selected first time period dependent upon the stored time period of the previous high heat mode, and means for terminating the low heat mode if the heating load is satisfied during the selected first time period.

13. The system of claim 12 wherein
the determining means determines whether continuation of the heating load still exists after the selected first time period of the low heat mode,
wherein the providing means further provides a high heat mode if the heating load continues until the heating load is satisfied, and
wherein the terminating means terminates the high heat mode when the heating load is satisfied.

14. The system of claim 12 wherein the storing means further stores the time at which the previous heating cycle ended,
wherein the recalling means further recalls the previous heating cycle end time, and
wherein the providing means provides the low heat mode further dependent upon the time duration between the previous heating cycle end time and determination of the existing heating load to be satisfied.

15. The system of claim 12 wherein the determining means is a single-stage thermostat.

16. An adaptive control system for providing a low heat mode and a high heat mode of a heating cycle in a furnace as a function of a previous heating cycle, comprising:
means for storing the time at which a previous heating cycle ended,
means for determining the existence of a heating load to be satisfied,
means for recalling the stored end time of the previous heating cycle,
means for providing a low heat mode for a selected first time period dependent upon the time duration between the previous heating cycle end time and determination of the existing heating load to be satisfied, and
means for terminating the low heat mode if the heating load is satisfied during the selected first time period.

17. The system of claim 16 wherein
the determining means determines whether continuation of the heating load still exists after the selected first time period of the low heat mode,
wherein the providing means further provides a high heat mode if the heating load continues until the heating load is satisfied, and
wherein the terminating means further terminates the high heat mode when the heating load is satisfied.

18. The system of claim 16 wherein the determining means is a single-stage thermostat.

* * * * *